US006753866B2

(12) United States Patent
Suzuki et al.

(10) Patent No.: US 6,753,866 B2
(45) Date of Patent: *Jun. 22, 2004

(54) PARALLEL PROCESSING PROCESSOR AND PARALLEL PROCESSING METHOD

(75) Inventors: Yoshinori Suzuki, Urawa (JP); Junichi Kimura, Menlo Park, CA (US)

(73) Assignee: Renesas Technology Corp., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 10/413,143

(22) Filed: Apr. 15, 2003

(65) Prior Publication Data

US 2003/0189572 A1 Oct. 9, 2003

Related U.S. Application Data

(63) Continuation of application No. 09/356,457, filed on Jul. 19, 1999, now Pat. No. 6,570,570.

(30) Foreign Application Priority Data

Aug. 4, 1998 (JP) .......................................... 10-220313

(51) Int. Cl.[7] .............................................. G06F 15/80
(52) U.S. Cl. ....................... 345/505; 345/559; 345/522; 345/561; 345/592
(58) Field of Search ................................ 345/501, 502, 345/561–563, 559, 522, 589, 592

(56) References Cited

U.S. PATENT DOCUMENTS

| 4,823,281 A | 4/1989 | Evangelisti et al. |
| 5,185,856 A | 2/1993 | Alcorn et al. |
| 5,486,844 A | 1/1996 | Randall et al. |
| 5,522,082 A | 5/1996 | Guttag et al. |
| 5,933,588 A | 8/1999 | Easwar et al. |
| 6,570,570 B1 * | 5/2003 | Suzuki et al. ............... 345/505 |

OTHER PUBLICATIONS

Proceedings of the IEEE, vol. 54, No. 12, Dec., 1966, "Very High–Speed Computing Systems," M. Flynn, pp. 1901–1909.

* cited by examiner

Primary Examiner—Kee M. Tung
(74) Attorney, Agent, or Firm—Mattingly, Stanger & Malur, P.C.

(57) ABSTRACT

A parallel processing processor for processing images including α data indicative of pixel transparency. The parallel processing processor comprises: a plurality of execution units for executing in parallel arithmetic and logical operations under control of a single instruction; general purpose registers which are connected to the execution units via a data path, which input data to the execution units and which receive results of operations from the execution units; α data dedicated registers which are connected to the execution units via another data path and which input data to the execution units; and a control circuit for directing data from the general purpose registers and α data dedicated registers into each of the execution units under control of a single instruction. Under the instruction, the execution units admit data from the general purpose registers to carry out first arithmetic and logical operation in parallel on the admitted data and, without returning result of the first arithmetic and logical operation to the general purpose registers, receive data from the α data dedicated registers to perform second arithmetic and logical operation in parallel between the received data and the result of first arithmetic and logical operation.

20 Claims, 9 Drawing Sheets

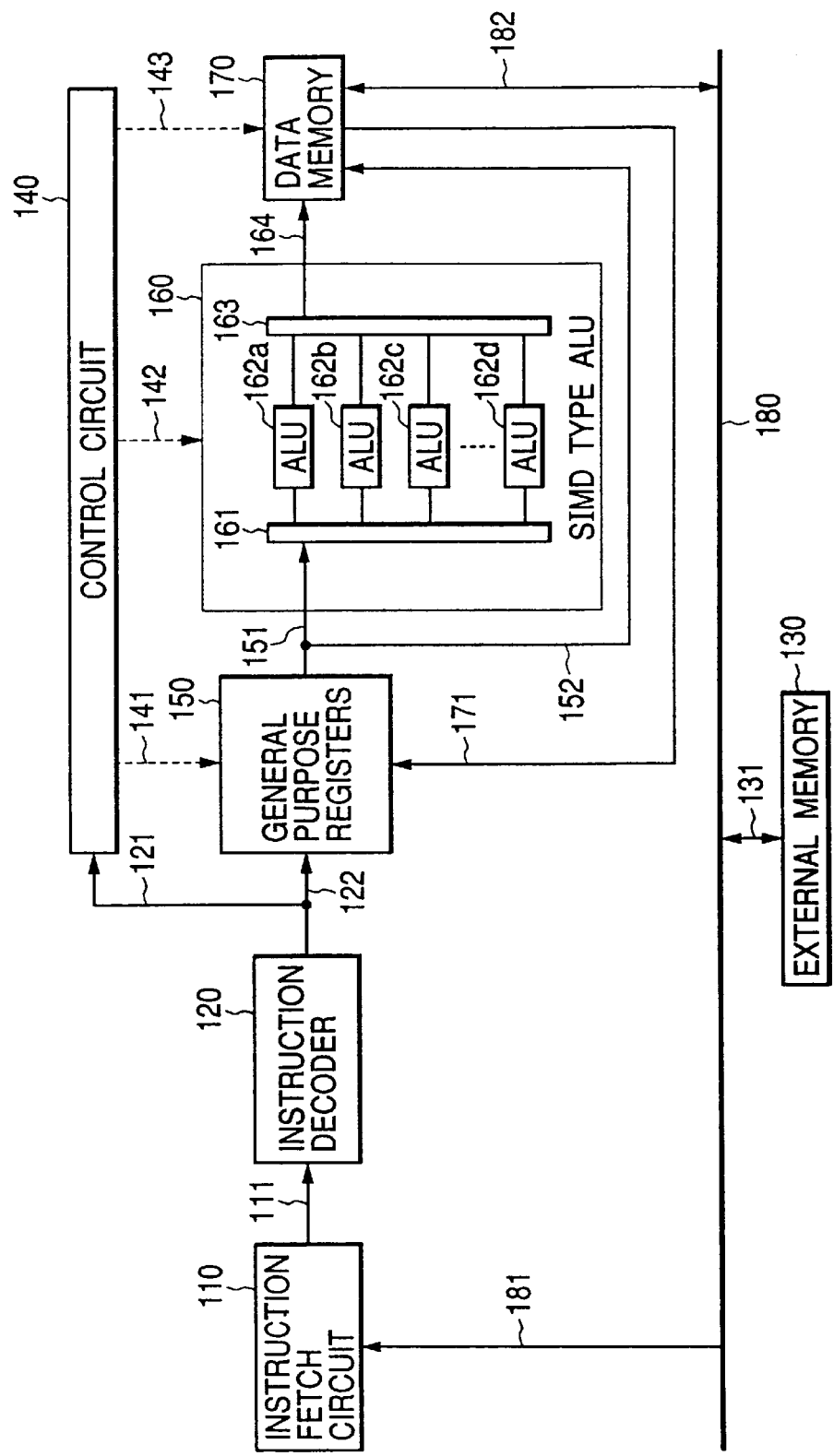

PARALLEL PROCESSING PROCESSOR AND PARALLEL PROCESSING METHOD

This application is a continuation application of U.S. Ser. No. 09/356,457, filed on Jul. 19, 1999, now U.S. Pat. No. 6,570,570.

BACKGROUND OF THE INVENTION

The present invention relates to a parallel processing processor and a parallel processing method. More particularly, the invention relates to a parallel processing processor and a parallel processing method for use therewith, the processor comprising a facility for processing in a dedicated structure α data representing the transparency of images, whereby image processing is performed at high speed.

Standards for digital moving pictures coding specify ways to divide a picture into blocks of a specific size each, to predict motions of each block and to code predictive errors per block. Such block-by-block processing is carried out effectively by software when the latter is run on a processor capable of performing operations on numerous pixels in response to a single instruction. Among many definitions of processor, those published by Flynn in 1966 are well known and widely accepted ("Very high-speed computing systems," Proc. IEEE, 12, 1091-9; Flynn, M. J., 1966). Processors, as defined by Flynn in the cited publication, fall into four categories: SISD (single instruction stream-single data stream) type, MIMD (multiple instruction stream-multiple data stream) type, SIMD (single instruction stream-multiple data stream) type, and MISD (multiple instruction stream-single data stream) type. The processor suitable for the above-mentioned block-by-block processing belongs to the SIMD type. According to Flynn, the SIMD type processor is characterized in that "multiple operands are executed by the same instruction stream (ibid.)."

Discussed below is how picture coding algorithms are processed illustratively by software using the SIMD type processor.

A typical algorithm to which the SIMD type processor is applied advantageously is motion compensation—a technique for removing correlations between frames that are temporally adjacent to one another. MPEG1 and MPEG2, both international standards for moving picture coding, embrace a technique called block matching for motion compensation.

Block matching, what it is and how it works, is outlined below with reference to FIG. 2. FIG. 2 is a conceptual view explaining how block matching is typically performed. A current frame 21 is a frame about to be coded. A reference frame 22 is a frame which is temporally close to an image of the current frame and which represents a decoded image of a previously coded frame. To effect block matching requires utilizing a luminance signal alone, or employing both a luminance signal and a chrominance signal. Where software is used for block matching, the luminance signal alone is generally adopted in view of relatively low volumes of operations involved. The description that follows thus assumes the use of the luminance signal alone.

The current frame 21 is first divided into blocks of the same size as indicated by broken lines (each block generally measures 16×16 pixels or 16×8 pixels). A temporal motion between the current frame 21 and the reference frame 22 is then detected for each block. A block 23 is taken up here as an example for describing how a temporal motion is specifically detected. A block 24 is shown spatially in the same position in the reference frame as the block 23 in the current frame. A region represented by the block 24 is moved, its size unchanged, to the position of a block 25 at an integer or half-pixel resolution. Every time such a motion take place, a summation is made of each absolute value of the difference between the blocks 24 and 23 regarding all their pixels. The process is carried out on all motion patterns that may be defined in a predetermined search range (e.g., from pixels −15 to +15 horizontally and pixels −15 to +15 vertically to the block 24). The motion from the block 24 to the block position representing the smallest summation of each absolute value of the difference therebetween is detected as a motion vector. For example, if the block 25 turns out to be the block representing the smallest summation of each absolute value of the difference, then a vector 26 is detected as a motion vector.

While indispensable for coding, block matching is a technique that requires a huge number of pixel-by-pixel operations (subtractive operations, absolute value operations, additive operations). Illustratively, if the picture size is 176×144 pixels and the block size is 16×16 pixels, the number of divided blocks is 99. In such a case, there are 289 search block patterns for each block provided the search range for block matching is set for ±18 pixels at an integer pixel resolution. It follows that each of the above-mentioned three types of operation needs to be carried out 289×99×256 times (i.e., the number of intra-block pixels). If the picture size is that of the standard television (SDTV), or if the motion search range needs to be enlarged illustratively to accommodate sports-related images, or if the pixel resolution needs to be maintained at a high level during the search, the volume of necessary operations will have to be increased tens- to hundreds-fold. For these reasons, it used to be general practice to employ dedicated hardware for executing block matching. Today, however, advances in processor technology and the emergence of simplified block matching techniques have made it possible for a general purpose processor to carry out the block matching process. As mentioned earlier, SIMD type processors are used advantageously to perform block-by-block processing such as block matching.

A conventional SIMD type parallel processing processor will now be described with reference to FIG. 3. FIG. 3 is a block diagram of a conventional parallel processing processor. The processor works as follows: instructions to be executed are first sent from an external memory 130 to an instruction fetch circuit 110 over a processor-to-main memory bus 180. The instruction fetch circuit 110 includes an instruction memory for instruction storage, a program counter, and an adder for controlling the address in a register in the program counter. The instruction fetch circuit 110 supplies an instruction decoder 120 with the received instructions in the order in which they are to be executed. Every time an instruction is received, the instruction decoder 120 decodes it to find such information as the type of operation, a read address and a write address. The information is transferred to a control circuit 140 and a general purpose register 150. Each instruction is then processed by the general purpose register 150, a SIMD type ALU 160 and a data memory 170 according to control information (141, 142, 143) from the control circuit 140. For purpose of simplification and illustration, it is assumed that the parallel processing processor shown in FIG. 3 has four SIMD type ALUs for concurrent processing of four pixels.

Described below is typical processing of block matching by use of the C language and an assembler code.

A C code 1 below is an example in which a block matching algorithm for a block is described in C language. It is assumed that the block size is 16×16 pixels and that a vector (vec_x, vec_y) is detected as representative of a motion vector when a value "error" becomes the smallest.

```
C code 1: an example of block matching
for(vec_y=-16;vec_y<16;vec_y++)
    for(vec_x=-16;vec_x<16;vec_x++){
        error = 0;
        for(i=0;i<16;i++)
            for(j=0;j<16;j++){
                error += abs(current(x+j, y+i)
                    - reference(x+j+vec_x, y+i+vec_y));
                /* current current frame, reference : reference
frame */
                    /* (x, y) : top left pixel position in block */
            }
    }
}
``` where, "for's" are statements in which to describe the loops in C language. The two outer "for" statements specify loops for a search range of 16×16 pixels vertically and horizontally; the two inner "for" statements designate loops in which to obtain differences of image data within a block; "current" stands for image data about the current frame with respect to an argument; and "reference" denotes image data on the reference frame.

An assembler code 1 shown below represents in an assembler code format the expression (abs(current(x+j, y+i)−reference(x+j+vec_x, y+i+vec_y))).

Assembler code 1: representative of additive expression to obtain motion vector

```
    LOAD R1, start_curr(R3)       # R1 = external memory
[R3+start_curr]
    LOAD R2, start_reference(R4)  # R2 = external memory
[R4+start_reference]
        # start_curr : address of the current frame data in
external memory
        # start_reference : address of the reference frame
data in external memory
    SUB R0, R1, R2
    ABS R5, R0
``` where, LOAD stands for a data transfer instruction for transferring data from the external memory 130 to the general purpose register 150, SUB for a subtractive arithmetic instruction (R0=R1−R2), and ABS for an absolutization arithmetic instruction (R5=|R0|).

How data operations take place with the assembler code 1 above in use will now be described with reference to FIGS. 3 and 4. FIG. 4 is a schematic view outlining how data operations are carried out conventionally by ALUs. In FIG. 4, a left-pointing arrow indicates reading of data from a register to the ALUs, and a right-pointing arrow denotes writing of data from the ALUs to a register.

Two LOAD instructions are first used to write data on the current and reference frames in the order from the external memory 130 to the data memory 170 in FIG. 3. The data written to the data memory 170 are loaded into registers R1 and R2 in accordance with write register information from the instruction decoder 120 (R3 and R4 are base registers designating positions of pixels in the frames).

A subtractive arithmetic instruction is then used to read the data from the registers R1 and R2 to the SIMD type ALU 160 in keeping with read register information from the instruction decoder 120. At the same time, the SIMD type ALU 160 acquires from the control circuit 140 ALU control information 142 that determines the type of operation. In this case, the type of operation is found to be subtractive. In the SIMD type ALU 160, a data demultiplexing circuit 161 demultiplexes the acquired information into four items of pixel data (g1 through g4) and (p1 through p4) as indicated by reference numerals 401 and 402 in FIG. 4. The data demultiplexing circuit 161 is wired in such a manner that the contents of the designated general purpose register are divided for input into four ALUs. After the demultiplexed data are assigned to the four ALUs 162a through 162d in FIG. 3, the pixel data items are each subjected to a subtractive operation by arithmetic elements 403a through 403d in FIG. 4. Following the operation, a data multiplexing circuit 163 in FIG. 3 multiplexes the resulting data. The result of the operation is placed into a register R0 in accordance with the write register information from the instruction decoder 120. The data multiplexing circuit 163 is wired in such a manner that the outputs of the four ALUs are combined for input into a single general purpose register.

An approximately similar process takes place with the absolute value operation. Data in the general purpose register R0 are first read into the SIMD type ALU 160 in keeping with the read register information from the instruction decoder 120. Simultaneously, the SIMD type ALU 160 acquires from the control circuit 140 ALU control information designating an absolute value operation. In the SIMD type ALU 160, the data demultiplexing circuit 161 demultiplexes the acquired information into four items of pixel data g1–p1 through g4–p4 as indicated by reference numeral 404 in FIG. 4. After the demultiplexed data are assigned to the four ALUs 162a through 162d in FIG. 3, the pixel data items are each subjected to an absolute value operation that provides absolute value data as indicated by reference numeral 405 in FIG. 4. Following the operation, the data multiplexing circuit 163 in FIG. 3 multiplexes the resulting data. The multiplexed data are placed into a register R5 in accordance with the write register information from the instruction decoder 120. Timing control for the processing above is provided by the control circuit 140.

The SIMD type processor, fit for repetitive operations as mentioned earlier, works in a most advantageous structure when carrying out block matching wherein the same operation is repeated on the pixels in a block.

As explained, parallel processing processors provide a viable technique for boosting the throughput of such image processing as block matching. Meanwhile, in a field of computer graphics where images of objects made up of arbitrary shapes (not just rectangular) are processed, it is now common practice to furnish each pixel in color space with what is known as α data representative of pixel transparency. To perform motion prediction such as that in block matching on images containing α data requires carrying out pixel-by-pixel data masking. The requirement tends to increase the amount of processing performed by SIMD type arithmetic and logical operation units, resulting in the throughput being impeded.

What follows is an outline of the significance of α data and of a block matching algorithm taking the α data into consideration. How the amount of necessary processing is bound to increase will then be described in more detail.

FIG. 5 is a schematic view showing relations between a frame and a bounding box. The block matching process described earlier is a technique that applies to rectangular images. In recent years, however, efforts have been made to handle images of arbitrary shapes in the framework of image coding; arbitrarily shaped images used to be dealt with primarily in the field of computer graphics. Each image of an arbitrary shape comprises shape information in addition to color information (sampling planes (e.g. Y plane, U plane and V plane) are included) composed of a luminance signal and a chrominance signal. The shape information is called α data or α image. As with a color signal, an item of α data has a value ranging from 0 to 255 (for eight-bit images) representative of the transparency of a pixel. Because of their ability to indicate transparency, the α data play an important role in displaying a combination of more than two images of arbitrary shapes. That is, color signals denoting the background, persons, characters and other images of arbitrary shapes are superposed one upon another for display in a manner proportional to the values constituting the α data. The combination of the superposed images makes up a single display image. Thus the color information about the pixels positioned so that their α data are zero constitutes pixel information that has no significance in the encoding or decoding of images. This can be a disadvantage if error computations (subtractive and absolute value operations) are performed on all pixels in the block (as in block matching) when block-by-block motion prediction is carried out on arbitrarily shaped images accompanied with α data. That is, the precision of motion prediction may decrease on a boundary region of arbitrary shapes. It is thus necessary to judge whether each pixel is a significant pixel on the basis of α data and, in the case of insignificant (i.e., transparent) pixels, to mask the addition of error values to the summation of absolute values (either no addition is performed or 0 is added).

Below is an example in which a motion vector detecting technique is applied to an image in FIG. 5. An object 51 is handled as a rectangular image 52 ready for image processing. The image 52 placed in a rectangular frame is generally called the bounding box. Image coding is carried out in units of such bounding boxes. The size of the box is generally given as a multiple of the block size for coding (usually 16×16 pixels). What follows is a description of how a motion vector is detected in a block 53 containing a region 54 having color information and a region 55 with no color information (blocks like the block 53 are each called a boundary block hereunder). It should be noted that transparent pixels having no color information possess α data that are zero values.

In order to implement block-by-block motion prediction taking α data into account, the above-cited C code 1 for block matching need only be replaced by the C code 2 or C code 3 shown below. This technique for motion prediction is called polygon matching as opposed to block matching. In this case, the α data may be one of two types: gray scale data constituting a value ranging from 0 to 255 (for eight-bit images), and binary data forming a value of either 0 or 255 (for eight-bit images). The C code 2 below is for binary data and the C code 3 for gray scale data.

The reference frame has no pixel with α data that are zero. The reason is that when a reconstructed frame is used as a reference frame, it is the encoder or decoder that compensates color information about any pixels having zero α data in the frame based on the surrounding pixels, the compensation being such that the α data will become 255 (for eight-bit images).

```
C code 2: an example of polygon matching with α data
taken into account (in the case of binary data)
    for (vec_y=-16;vec_y<16;vec_y++)
        for(vec_x=-16;vec_x<16;vec_x++){
            error = 0;
        for(i=0;i<16;i++){
            for(j=0;j<16;j++){
                error += (alpha(x+i, y+j)) & (abs(current(x+j, y+i)
                - reference(x+j+vec_x, y+i+vec_y)));
                /* current : color data on current frame,
            reference : reference frame */
                /* alpha : α data on current frame */
                /* (x, y) : position of top left pixel in block
                */
            }
        }

C code 3: an example of polygon matching with α data
taken into account (in the case of gray scale data)
```

-continued

```
    for (vec_y=-16; vec_y<16;vec_y++)
        for(vec=x-16;vec_x<16;vec_x++){
            error = 0;
        for(i=0;i<16;i++)
            for(j=0;j<16;j++){
                error += (!(alpha(x+i, y+j) == 0)) *
                (abs(current(x+j, y+i) - reference(x+j+vec_x,
                y+i+vec_y)));
                /* current : color data on current frame,
            reference : reference frame */
                /* alpha : α data on current frame */
                /* (x, y) : position of top left pixel in block
                */
            }
        }
```

In the C code 2 above, the color data about the current frame and reference frame are subjected to an absolute value operation, and the result of the operation is ANDed with each bit of the α data. It follows that if the α data are zero, the value to be added is zero regardless of the result of the absolute value operation.

In the C code 3 above, a check is made to see if each α data item is zero. If the data item is found to be zero, the logical expression becomes true (taking a value of 1), and the logical negation of the expression is zero. If the α data item is judged to be other than zero, the logical negation of the logical expression is 1. As a result, the value to be added is zero when the α data item is zero, and becomes the result of the absolute value operation when the α data item is other than zero.

As described, whether the C code 2 or C code 3 is in use, the polygon matching process with α data taken into consideration involves frequent execution of data masking (i.e., as frequent as per pixel) whereby the data to be added to the error value is replaced by zeros.

It is therefore an object of the present invention to overcome the above and other disadvantages of the prior art and to provide a parallel processing processor for performing image processing involving α data, the processor having a dedicated function for dealing with the α data so that the burden of processing shared by parallel execution units is alleviated and that the throughput of the processor as a whole is improved.

SUMMARY OF THE INVENTION

In carrying out the invention and according to one aspect thereof, there is provided a parallel processing processor for processing images including α data indicative of pixel transparency, the parallel processing processor comprising: (a) a plurality of execution units for executing in parallel arithmetic and logical operations under control of a single instruction; (b) general purpose registers which are connected to the execution units via a data path, which input data to the execution units and which receive results of operations from the execution units; (c) α data dedicated registers which are connected to the execution units via another data path and which input data to the execution units; and (d) controlling means for directing data from the general purpose registers and the α data dedicated registers into each of the execution units under control of a single instruction.

According to another aspect of the invention, there is provided a parallel processing processor of the structure outlined above wherein, under control of a single instruction, the execution units admit data from the general purpose registers to carry out first arithmetic and logical operation on the admitted data and, without returning result of the first arithmetic and logical operation to the general purpose registers, receive data from the α data dedicated registers to perform second arithmetic and logical operation between the received data and the result of the first arithmetic and logical operation.

According to a further aspect of the invention, there is provided a parallel processing method for use with a plurality of execution units for executing in parallel arithmetic and logical operations under control of a single instruction, the parallel processing method processing images including α data indicative of pixel transparency and comprising the steps of: (a) inputting a plurality of first data from general purpose registers to the execution units for performing first arithmetic and logical operation in parallel by the units; (b) inputting a plurality of second data corresponding to the first data from α data dedicated registers to the execution units without returning result of the first arithmetic and logical operation to the general purpose registers, so as to perform second arithmetic and logical operation between the second data and the result of the first arithmetic and logical operation; and (c) outputting result of the second arithmetic and logical operation to a general purpose register designated by an instruction.

Other objects, features and advantages of the invention will become more apparent upon a reading of the following description and appended drawings.

BRIEF DESCRIPTION OF THE DRAWINGS

FIG. 3 is a block diagram of a conventional parallel processing processor;

DESCRIPTION OF THE PREFERRED EMBODIMENTS

Figure 1:
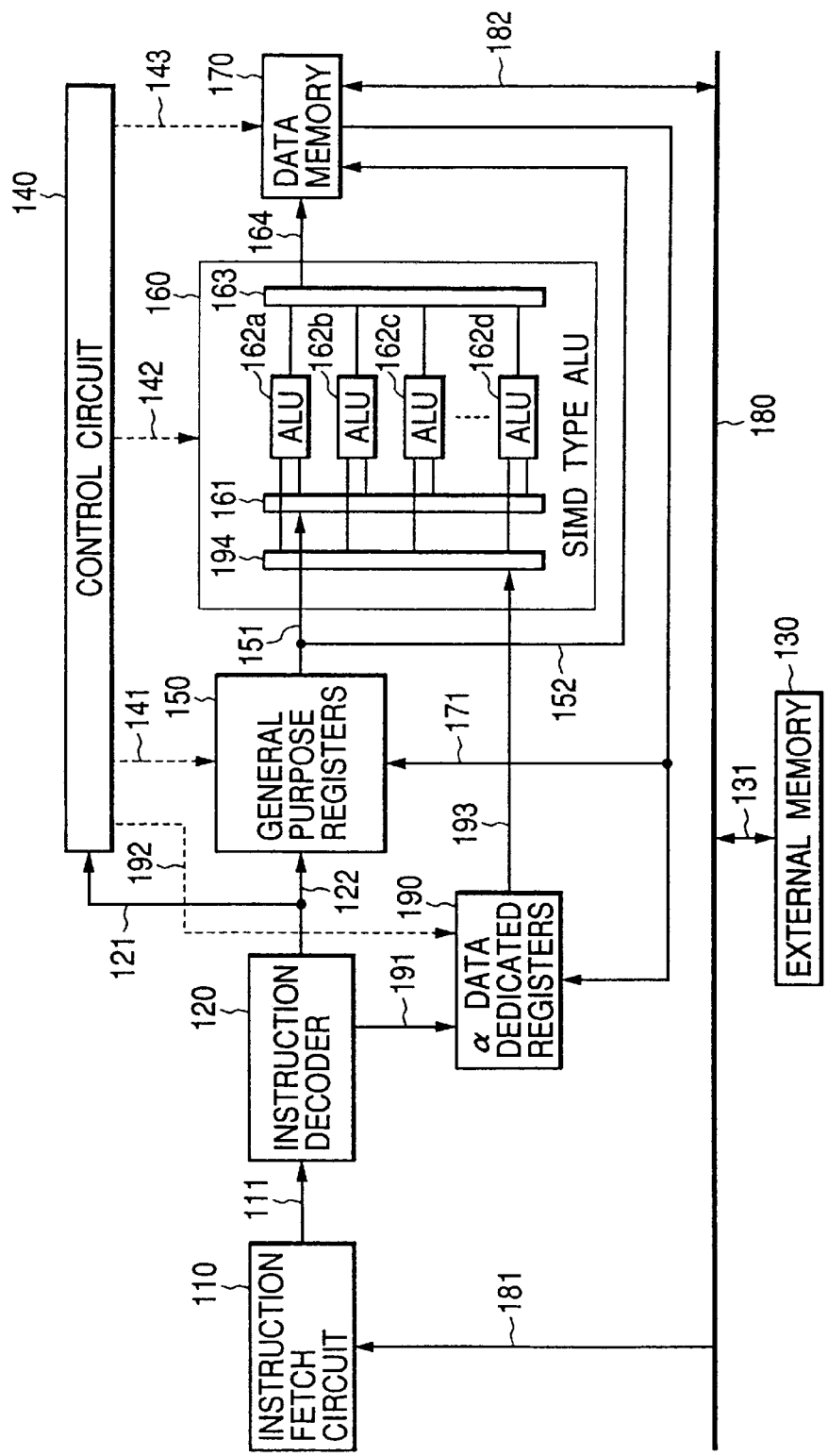
FIG. 1 is a block diagram of a parallel processing processor practiced as an embodiment applicable where α data are binary data.
Figure 2:
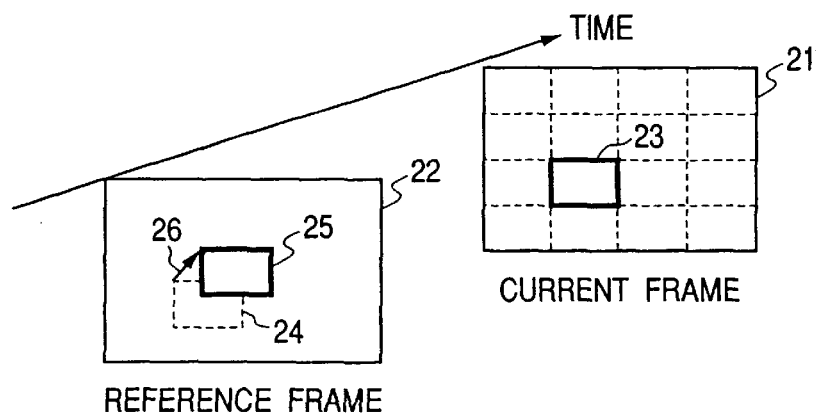
FIG. 2 is a conceptual view showing how block matching takes place.
Figure 4:
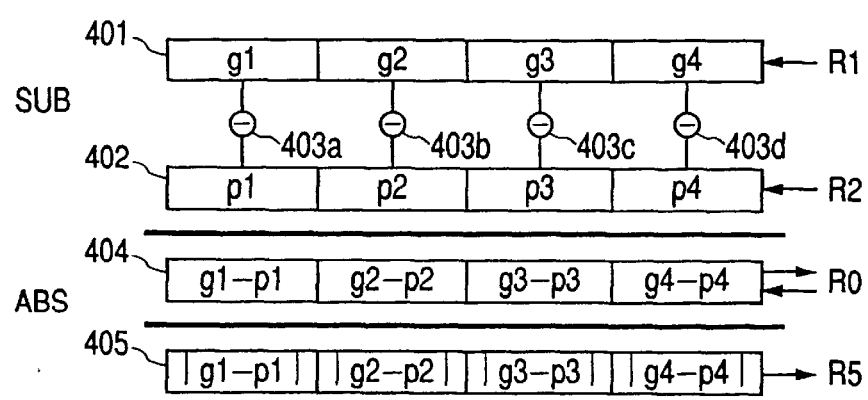
FIG. 4 is a schematic view outlining how ALUs operate conventionally on data.
Figure 5:
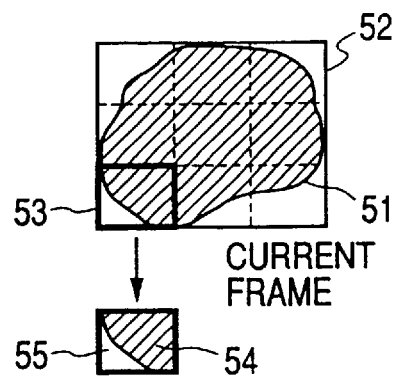
FIG. 5 is a schematic view depicting relations between a frame and a bounding box.

Preferred embodiments of this invention will now be described with reference to the accompanying drawings. Format of instructions for block matching with α data taken into consideration, and configuration of a parallel processing processor embodying the invention As described earlier, data mask processing executed frequently during polygon matching with α data taken into account contributes to lowering the throughput of the processor. The disadvantage is circumvented by the invention envisaging data paths for inputting α data to ALUs in synchronism with color information, as well as a format of instructions suitable for carrying out such operations. Greater amounts of processing including compare operations need to be performed, as will be understood, when the α data are gray scale data than when the α data are binary data. For that reason, the invention also considers data paths allowing the α data as gray scale data to be transformed to binary data before the gray scale data are read into SIMD type ALUs (i.e., to facilitate masking of the gray scale data), as well as a format of instructions for supporting such operations.

(I) Polygon matching performed when α data are binary data

First to be explained is an example of polygon matching wherein the α data are binary data. The data path for inputting the α data to ALUs in synchronism with color information is explained below, along with a suitable format of instructions for supporting such operations.

The expression ((alpha(x+i, y+j)) & (abs(current(x+j, y+i)−reference(x+j+vec_x, y+i+vec_y)))) by which to obtain a value to be added to an error value in the C code 2 may be replaced by an assembler code (assembler code 2) as follows:

Assembler code 2: an example of polygon matching wherein α data are binary data (wherein an additive expression to obtain a motion vector in the C code 2 is developed by use of conventional instructions)

```
LOAD R1, start_curr(R4)      #R1 = external memory
[R4+start_curr]
LOAD R2, start_reference(R5) #R2 = external memory
[R5+start_reference]
LOAD R3, start_alpha(R6)     #R3 = external memory
[R6+start_alpha]
    # start_curr : address of the current frame data in
external memory
    # start_reference : address of the reference frame
data in external memory
    # start_alpha : address of the current frame α data in
external memory
SUB R0, R1, R2
ABS R7, R0
AND R9, R7, R3
``` where, LOADs stand for data transfer instructions for transferring data from an external memory to general purpose registers, SUB for a subtractive arithmetic instruction (R0=R1−R2), ABS for an absolutization arithmetic instruction (R7=|R0|), and AND for an AND logical operation instruction on each bit (R9=R7&R3).

When the assembler code 2 above is in use, color data on the current frame are loaded into a general purpose register R1, color data on the reference frame into a general purpose register R2, and α data on the current frame into a general purpose register R3 from the external memory. A general purpose register R0 is loaded with the color data on the current frame minus the color data on the reference frame, and a general purpose register R7 is set with an absolute value of the contents in the register R0. Lastly, the contents in the general purpose register R7 are ANDed with the α data on the current frame for the execution of masking.

Comparing the assembler code 2 with the assembler code 1 reveals that the assembler code 2 is supplemented by the loading of the α data into the register R3 and by the masking process following the absolutization arithmetic operation. According to the invention, dedicated registers (called α data dedicated registers hereunder) are provided for the input of α data to ALUs over a data path different from that between general purpose registers and the ALUs. This arrangement allows an arithmetic operation such as addition to be performed in synchronism with data masking. Also provided is an appropriate format of instructions for letting the α data be input to the ALUs in synchronism with color information so that arithmetic and logical operations may be carried out within a single instruction cycle.

A typical structure of a parallel processing processor embodying the invention is described below with reference to FIG. 1. FIG. 1 is a block diagram of a parallel processing processor practiced as an embodiment applicable where α data are binary data.

When compared with a conventional parallel processing processor of FIG. 3, the inventive processor of FIG. 1 is noted for the presence of α data dedicated registers 190 inside. The α data dedicated registers 190 operate in accordance with control information 192 from a control circuit 140. As with general purpose registers 150, the α data dedicated registers 190 are connected to an instruction decoder 120, a data memory 170 and a SIMD type ALU arrangement 160. In the inventive parallel processing processor, the α data dedicated registers 190 are installed independently of the general purpose registers 150 and furnished with a different data path. The setup makes it possible for the α data dedicated registers 190 to receive an instruction from the instruction decoder 120 and to read data out to the SIMD type ALU arrangement 160 in synchronism with the transfer of data from the general purpose registers 150. In this context, operating "in synchronism" signifies that the color data in the general purpose registers and the α data in the α data dedicated registers are fed to the ALU arrangement simultaneously in response to a single instruction. For purpose of simplification and illustration, the inventive processor is assumed to have four SIMD type ALUs installed in parallel so that processing is performed simultaneously on four pixels.

The format of instructions suitable for the embodiment is described below, along with a typical manner in which the embodiment is operated by such instructions. From the viewpoint of its structure, an α data dedicated register setup may comprise either one α data dedicated register or a plurality of α data dedicated registers, i.e., there may be one register address or a plurality of register addresses in the setup.

(1) α data dedicated register setup involving one register address

When the α data dedicated register setup has one register address, the assembler code 2 written in conventional instructions may be replaced by an assembler code 3 as follows:

Assembler code 3: format of instructions suitable for the inventive parallel processing processor wherein α data are binary data and wherein the α data dedicated register setup has one register address LOAD R1, start_curr(R4)
LOAD R2, start_reference(R5)
LOAD R α, start_alpha(R6)
SUB R0, R1, R2
ABSAND R9, R0 where, LOADs stand for data transfer instructions for transferring data from the external memory to the general purpose registers, SUB for a subtractive arithmetic instruction (R0=R1−R2), and ABSAND for a combined instruction of an absolutization arithmetic instruction and a bit-by-bit AND logical operation instruction (R9=|R0|&R α). It will be appreciated that in order to operate the inventive parallel processing processor of FIG. 1 effectively, the assembler code 3 needs an instruction for loading the α data from the external memory into the α data dedicated registers and a new instruction combining an absolutization arithmetic instruction with an AND logical operation instruction. When the α data dedicated register setup has only one register address, the address of the register from which to read data out to each ALU is determined definitively without specific designation of that address. That is, the designation of register R α is not indispensable for an instruction input.

Figure 6:
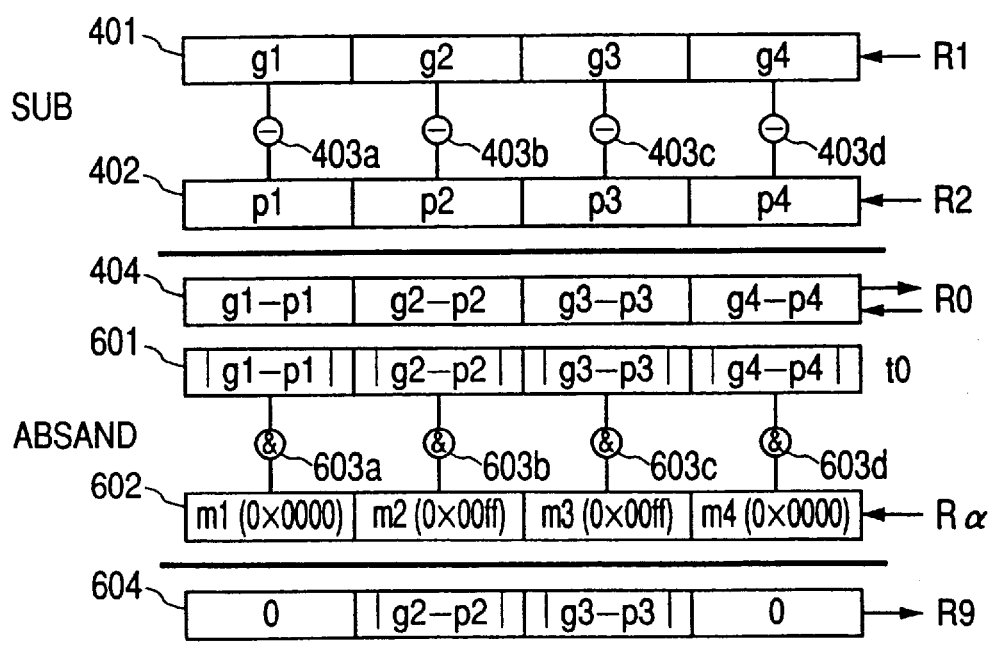
FIG. 6 is a schematic view of a typical setup in which ALUs of the embodiment operate on data.

How data operations take place with the assembler code 3 in use will now be described with reference to FIGS. 1 and 6. FIG. 6 is a schematic view depicting how the ALUs typically operate on data. In the right-hand side portion of FIG. 6, a left-pointing arrow indicates reading of data from a register to ALUs, and a right-pointing arrow denotes writing of data from ALUs to a register.

LOAD instructions are first used to write consecutively the color data and α data on the current frame as well as the color data on the reference frame from the external memory 130 into the data memory 170, as shown in FIG. 1.

Once written in the data memory 170, the color data are loaded into the general purpose registers R1 and R2, and the α data are set to the register R α in the α data dedicated register setup 190 in accordance with write register information from the instruction decoder 120 (notice that R4, R5 and R6 denote base registers representing pixel positions in each frame).

A subtractive operation instruction is then carried out. This instruction is the same as that already described in connection with the related art. The subtractive operation instruction is followed by the combined instruction of an absolutization arithmetic instruction and an AND logical operation instruction.

The data in the general purpose register R0 are first read into the SIMD type ALU arrangement 160 in accordance with read register information 122 from the instruction decoder 120. In synchronism with this operation, the data in the register R α are read from the α data dedicated register setup out to the SIMD type ALU arrangement 160 in keeping with a data read command 191 from the instruction decoder 120. At the same time, the SIMD type ALU arrangement 160 acquires from the control circuit 140 ALU control information indicating the combination of an absolutization arithmetic operation with an AND logical operation.

In the SIMD type ALU arrangement 160, the data demultiplexing circuit 161 (in FIG. 1) demultiplexes the result of the subtractive operation into four data items (g1–p1) through (g4–p4), and a data demultiplexing circuit 194 (FIG. 1) demultiplexes the α data into four α data items m1 through m4, as indicated by reference numerals 404 and 602 in FIG. 6. After the demultiplexed data are assigned to the four ALUs 162a through 162d in FIG. 1, the pixel data items are each subjected to further operations.

First, the four data items indicated by reference numeral 404 in FIG. 6 are subjected to an absolute value operation. The result of the operation is held temporarily in a memory t0 of the ALUs 601 in FIG. 6. Secondly, the data items in the memory t0 are ANDed on a bit-by-bit basis with the divided α data indicated by reference numeral 602 in FIG. 6. This operation amounts to the masking of the pixels whose α data are zero. In hexadecimal notation, "0x0000" stands for a two-byte 0 and "0x00ff" for 255. It is assumed here that eight-bit color data and eight-bit α data are expanded respectively into a 16-bit format in the registers. At the end of the second operation, the data multiplexing circuit 163 in FIG. 1 multiplexes the data. The multiplexed data are written to the register R9 in accordance with the write register information from the instruction decoder 120. Timing control for the processing above is provided by the control circuit 140.

Figure 7:
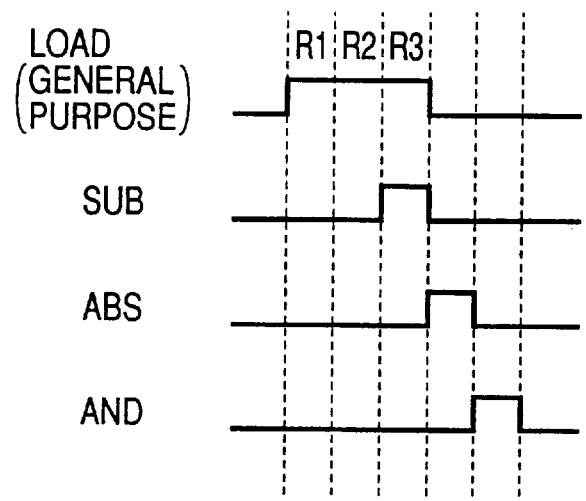
FIG. 7 is a timing chart in effect when instructions are conventionally executed.

FIG. 7 is a timing chart in effect when instructions are conventionally executed with the assembler code 2 in use.

The color data on the current frame and reference frame are first loaded successively from the external memory into the general purpose registers R1 and R2. The data in the registers R1 and R2 are then input to the ALUs for a subtractive operation (SUB) by the latter. The result of the operation is returned to the general purpose register R0. At this point, the α data positioned in spatial correspondence with the color data on the current frame are loaded on a pipeline basis from the external memory into the general purpose register R3. Thereafter, the data in the register R0 are subjected to an absolute value operation (ABS). Lastly, the result of the absolute value operation is ANDed with the data in the register R3. Executing the AND operation amounts to masking the result of the instructions (SUB, ABS) performed on the color data whose α data are zero.

Figure 8:
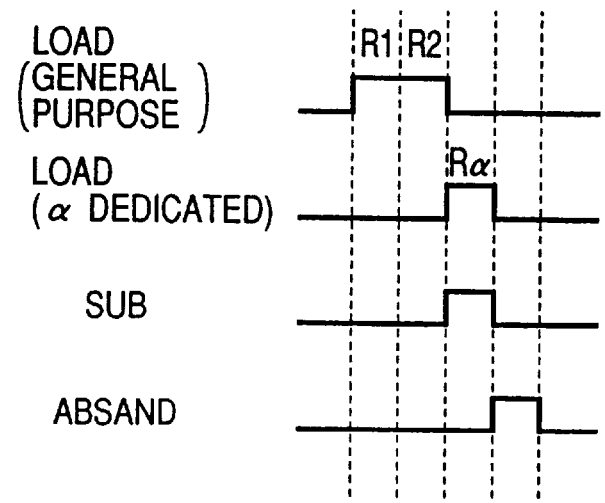
FIG. 8 is a timing chart in effect when instructions are carried out by the embodiment.

FIG. 8 is a timing chart in effect when instructions are carried out by the embodiment with the assembler code 3 in use. After the loading of data into the general purpose registers R1 and R2, the α data positioned in spatial correspondence with the color data on the current frame are loaded on a pipeline basis into the α data dedicated register R α at the same time as the subtractive operation between the registers R1 and R2. Thereafter, the data in the registers R0 and R α are input to the ALUs for an ABSAND operation by the latter.

Conventionally, executing an AND operation requires designating the addresses of two general purpose registers so that their data are fed to ALUs. This means that after an ABS operation, the AND operation cannot be performed without returning result of the ABS operation to a general purpose register. With the embodiment, by contrast, α data are loaded into α data dedicated register separate from general purpose registers. This makes it possible for the α data to be supplied from the α data dedicated register to AND operators in the ALUs in response to the ABSAND instruction. Since the result of an ABS operation within the ABSAND instruction forms a second input to the AND operators, the AND operation may be carried out (i.e., as an instruction masking process) without returning result of the ABS operation to a general purpose register. As a result, the ABSAND instruction is executed in a single instruction cycle.

To provide an ABSAND instruction in a conventional setup would require designating four general purpose registers R0, R7, R3 and R9 in an instruction format. This requirement, besides being a disadvantage by itself, is compounded by the need to return result of the ABS operation to the register R7. This makes it difficult for the conventional setup to execute the ABSAND instruction in a single instruction cycle.

(2) α data dedicated register setup involving a plurality of register addresses

When the α data dedicated register setup has a plurality of register addresses, two instruction formats are conceivable:

In a first instruction format, the addresses of individual registers in the α data dedicated register setup are made to correspond to the addresses of general purpose registers on a one-to-one basis. Where this format is used, the α data and color data on the current frame are loaded into the correspondingly furnished α data dedicated registers and general purpose registers. This allows the assembler code 3 to be utilized unmodified. The reason is that the address of the register containing the α data to be read out to the SIMD type ALU is uniquely determined by the address of the general purpose register holding the data to be fed to the ALU.

In a second instruction format, the address of an α data dedicated register whose contents are to be read to the SIMD type ALU is separately designated. To use this format requires replacing the format of the ABSAND instruction in the assembler code 3 by the format of an assembler code 4 shown below.

Assembler code 4: format of instructions suitable for the inventive parallel processing processor wherein α data are binary data and wherein the address of an α data dedicated register is explicitly designated LOAD R1, start_curr(R4)

LOAD R2, start_reference(R5)

LOAD R α 1, start_alpha(R6)

SUB R0, R1, R2

ABSAND R9, R0, R α 1 where, LOADS stand for the data transfer instructions for transferring data from the external memory to the general purpose registers, SUB for a subtractive arithmetic instruction (R0=R1−R2), and ABSAND for a combined instruction of an absolutization arithmetic instruction and a bit-by-bit AND logical operation instruction (R9=|R0|&R α 1). "R α 1" indicates the designation of a register R α 1 selected from among a plurality of registers R α 1, R α 2, etc., constituting the α data dedicated register setup 190.

Unlike the assembler code 3, the assembler code 4 has a register address designated in the ABSAND instruction, the register address denoting an α data dedicated register containing the α data to be read out to the SIMD type ALU. Specifically, the register R α 1 is designated within the ABSAND instruction in the assembler code 4.

The data operations in the assembler code 4 are the same as those explained in connection with the assembler code 3. The only difference is that the register R α 1 is used for the loading of the α data and that the data in the register R α 1 are used by the ABSAND instruction.

(II) Polygon matching performed when α data are gray scale data

Explained next is an example of polygon matching wherein the α data are gray scale data. If it is desired to use gray scale α data having values ranging from 0 to 255 (for eight-bit images), e.g., if several images of arbitrary shapes are to be combined to form a composite image for display in keeping with α data proportions, the parallel processing processor of FIG. 1 is structurally sufficient for the purpose.

However, where data masking is involved as in polygon matching, it is not desirable for gray scale data to be used unchanged. As described earlier, data masking in the polygon matching process with α data taken into account requires color data to be ignored when the α data are zero and allows the color data to be used unmodified for calculations when the α data take on other values. This type of processing is carried out by conventional SIMD type processors using the following methods:

(1) The control circuit 140 of FIG. 3 is furnished with memory registers for performing data masking operations with the ALUs 162a through 162d. Either all 0's or all 1's is placed in the memory register corresponding to each α data item being found to be 0 or otherwise. The data masking process is performed by a special AND operation instruction carried out on the memory registers and the ALUs.

(2) The content of a designated general purpose register is specifically updated depending on whether each α data item is judged to be 0 or otherwise. In accordance with the updated register content, the data designated by a special instruction are masked.

As indicated in the above two examples, the SIMD type processor is not particularly good at performing the process of judging whether a given α data item is 0 and masking color data according to the judgment. Some of C codings and C compilers may sometimes involve generation of conditional branch instructions and multiplication instructions. This means that where judgments and conditional branches are repeated on each pixel as in polygon matching, the conventionally structured SIMD type processor cannot be used advantageously. For example, if the method (2) above is employed, the expression for finding the value to be added to an error value in the C code 3 is replaced by an assembler code as follows:

Assembler code 5: for polygon matching wherein α data are gray scale data and wherein part of the C code 3 is developed by use of conventional instructions LOAD R1, start_curr(R4)
    LOAD R2, start_reference(R5)
    LOAD R3, start_alpha(R6)
    SUB R0, R1, R2
    ABS R7, R0
    SMTIU R8, R3, 0
    MULTU R9, R8, R7 where, LOADs stand for the data transfer instructions for transferring data from the external memory to the designated general purpose registers, SUB for a subtractive arithmetic instruction (R0=R1−R2), ABS for an absolutization arithmetic instruction (R7=|R0|), SMTIU for a conditional branch instruction (if (R3>0) R8=1; else R8=0), and MULTU for a multiplication instruction for data masking (R9=R8×R7).

Comparing the assembler code 5 with the assembler code 2 shows that the assembler code 5 for use with gray scale α data requires greater amounts of processing than the assembler code 2 for which the α data are binary data.

Given such a requirement for the assembler code 5, the invention provides an effective method for transforming gray scale α data to binary data before the data are read into SIMD type ALUs. The method is implemented by resorting to a suitable data path arrangement and an appropriate instruction format. The preliminary execution of the transforming process makes it possible to apply the combined instruction of an absolutization arithmetic instruction and a bit-by-bit AND logical operation instruction, as described above in conjunction with the assembler codes 3 and 4.

Figure 9:
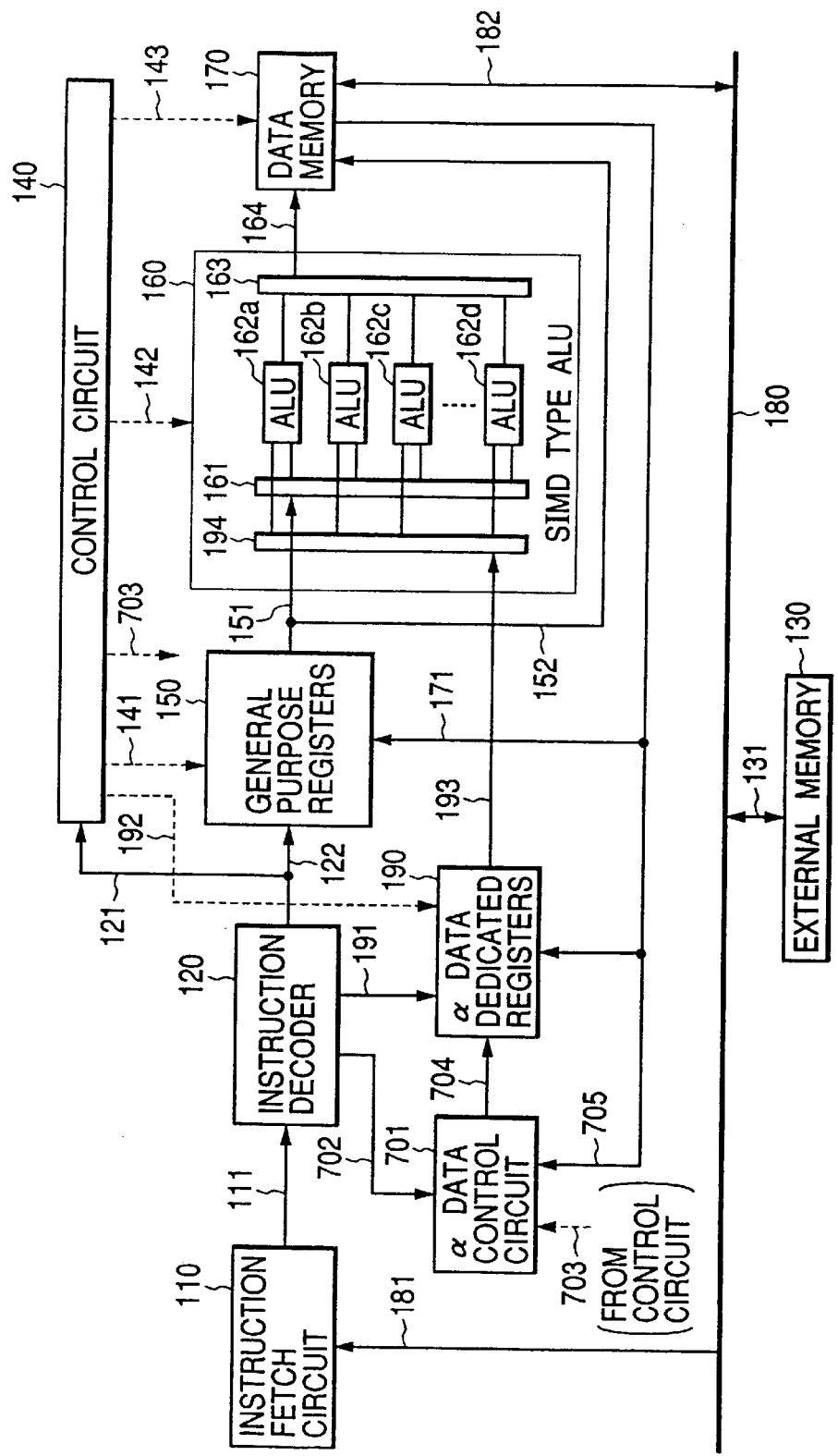
FIG. 9 is a block diagram of a parallel processing processor practiced as another embodiment of the invention applicable where α data are gray scale data.
Figure 10:
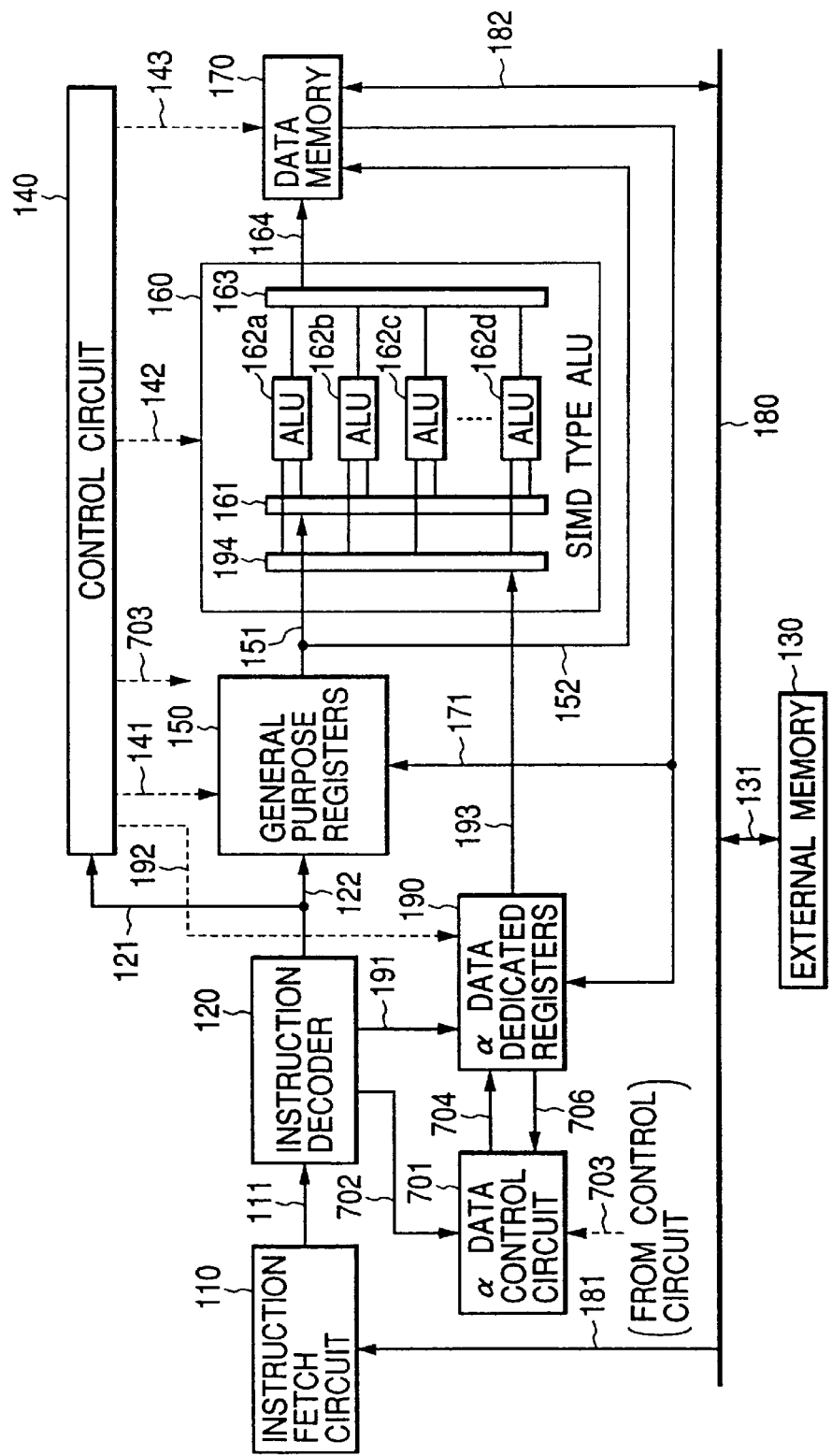
FIG. 10 is a block diagram of a parallel processing processor practiced as yet another embodiment of the invention applicable where α data are gray scale data.

Described below with reference to FIGS. 9 and 10 is how the parallel processing processor of the invention is structured for use when α data are gray scale data. FIG. 9 is a block diagram of a parallel processing processor practiced as another embodiment of the invention applicable where α data are gray scale data, and FIG. 10 is a block diagram of a parallel processing processor practiced as yet another embodiment of the invention in effect when α data are gray scale data.

(II-1) When α data are gray scale data, with the α data transformed to binary data and loaded into the α data dedicated registers The inventive parallel processing processor separately includes parallel execution units capable of transforming gray scale α data to binary data with a degree of parallelism as high as that of SIMD type ALUs. This facility permits transforming the α data before the data are read into the SIMD type ALUs. As can be seen from a comparison of FIGS. 1, 9 and 10, what makes the inventive processor distinct from others is the presence of an α data control circuit 701 inside the processor.

The α data control circuit 701 operates on control information 703 from the control circuit 140. In both embodiments of FIGS. 9 and 10, the α data control circuit 701 is connected to the instruction decoder 120 and α data dedicated registers 190. The difference between the two embodiments lies in the fact that the embodiment of FIG. 10 has its α data control circuit always supplied with data from the α data dedicated registers, while the embodiment of FIG. 9 has its α data control circuit fed with data directly from the data memory. There are advantages and disadvantages for each of the two structures. The embodiment of FIG. 9 requires less amount of processing between the loading of data and their transformation than the embodiment of FIG. 10 but, unlike the latter, is incapable of transforming data in the α data dedicated registers. Conceivably, the desirable features of the two structures may be combined illustratively into a setup where a data line 705 in FIG. 9 and a data line 706 in FIG. 10 are both installed. In any case, there are provided four SIMD type ALUs as well as four execution units in the α data control circuit for purpose of simplification and illustration.

As described, separating the α data transforming function from the SIMD type ALU arrangement 160 makes it possible to process color data and gray scale α data in parallel.

The inventive parallel processing processors practiced as shown in FIGS. 9 and 10 are utilized effectively to process color data and gray scale α data in parallel manner by use of a new instruction: one that combines an instruction for loading α data into an α data dedicated register, with an instruction for transforming the α data to binary data.

Figure 11:
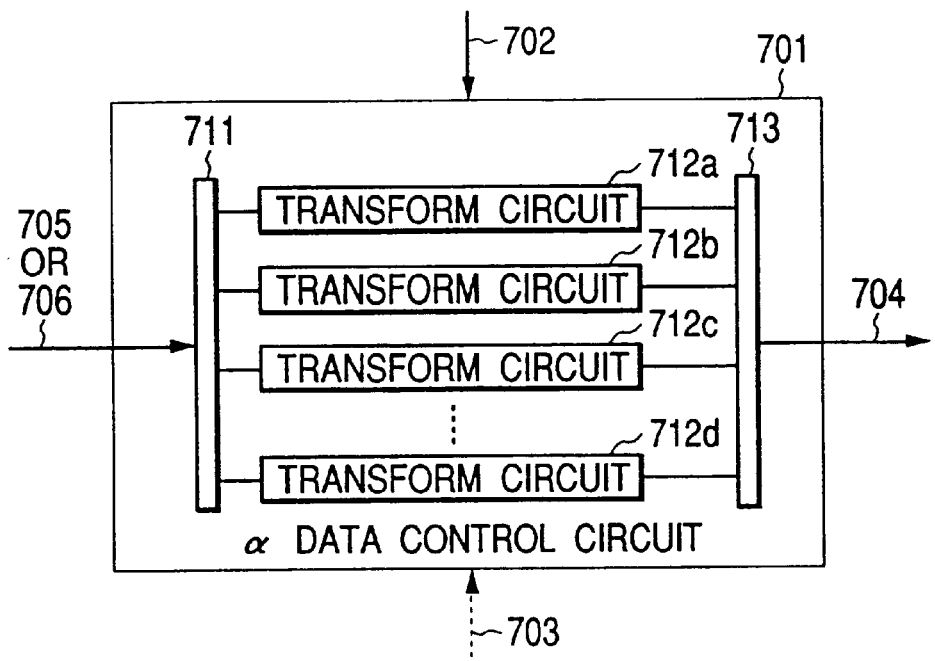
FIG. 11 is a block diagram of an α data control circuit used by the embodiments.
Figure 12:
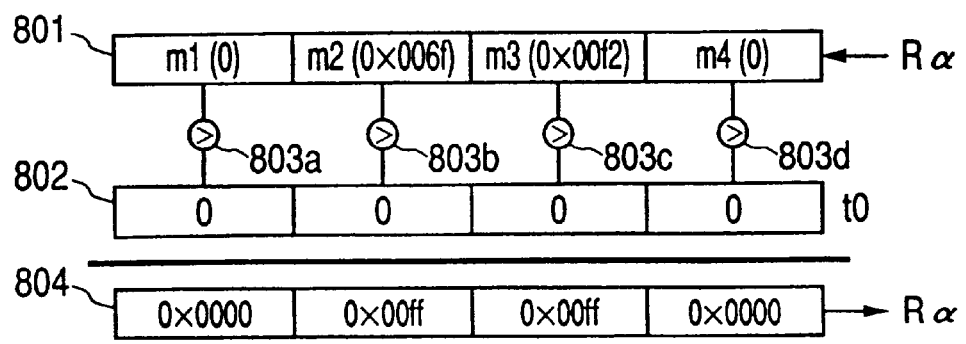
FIG. 12 is a schematic view of a typical data operation process inside the α data dedicated control circuit.

Described below with reference to FIGS. 11 and 12 is the instruction format applicable to the parallel processing processor of the invention for use when α data are gray scale data. How the processor works will also be explained.

FIG. 11 is a block diagram of an α data control circuit used by the embodiments, and FIG. 12 is a schematic view of a typical data operation process inside the α data control circuit. In FIG. 12, a left-pointing arrow indicates reading of data from an α data dedicated register to the ALUs inside the α data control circuit, and a right-pointing arrow denotes writing of data from the ALUs in the α data control circuit to an α data dedicated register.

The α data are first loaded into the data memory 170 shown in FIG. 9 or 10. In the embodiment of FIG. 9, the loaded data are read directly over the data line 705 into a data demultiplexing circuit 711 (in FIG. 11); in the embodiment of FIG. 10, the loaded data are read via the α data dedicated registers and over the data line 706 into the data demultiplexing circuit 711. The α data thus read out are demultiplexed into four data items (m1 through m4) as shown in FIG. 12 before they are input to transform circuits 712a through 712d.

The transform circuits 712a through 712d compare each of the data items m1 through m4 with an instruction-designated threshold value (0 in this case) as indicated by reference numerals 803a through 803d. The operations provide four transformed values each denoting either 0 or 255 (for eight-bit images) as indicated by reference numeral 804. Specifically, an α data item of 0 is transformed to 0x0000 (two-byte zero in hexadecimal notation); an α data item of other than 0 is transformed to 0x00ff. When placed in the register, an eight-bit α data item is expanded into 16-bit data. These transformed values are multiplexed into a single data item by a data multiplexing circuit 713 in FIG. 11. The multiplexed data item is output to the α data dedicated register 190 over a data line 704.

The combined instruction of an instruction for loading data into the α data dedicated register and an instruction for transformation into binary data may be expressed illustratively in the assembler format shown below. In the format, "0" represents the threshold value for the compare operation.

LOADBin R α, start_alpha(R6), 0

When the α data are gray scale data, the inventive method of parallel processing involves transforming the gray scale α data into binary data and then loading the binary data into the α data dedicated register 190 for use in subsequent operations. It follows that the masking process need only employ the ABSAND instruction explained earlier as the combination instruction in connection with the assembler codes 3 and 4. More specifically, where the assembler code is to be developed, the LOAD instruction on the third line in the code need only be replaced by the LOADBin instruction shown above. The timing chart in effect for execution of the instruction is the same as that given in FIG. 8.

(II-2) When α data are gray scale data, wherein mask data are generated separately from the α data and loaded into the α data dedicated register Another processing method for use when the α data are gray scale data are described below. In the above example of (II-1), the gray scale α data were transformed to binary data before being loaded into the α data dedicated registers 190. In that case, the assembler codes 3 and 4 were used and the binary α data placed in the α data dedicated registers were subjected to the ABSAND instruction combining an absolute value operation on color data with a bit-by-bit AND logical operation, as described above.

The processing method here applies when the α data are gray scale data, with mask data assigned to each of the pixels involved. An arithmetic instruction is provided to deal with data masking.

Illustratively, pixels not subject to data masking are assigned mask data of 0; those applicable to data masking are assigned mask data of 1. Depending on its mask data value, each pixel is judged to be either subject or not subject to data masking. That is, the output value of color data is replaced by zero only if the mask data value is zero.

The inventive parallel processing processor for use with the above method is structured so that the mask data are preserved per pixel in the α data dedicated registers 190 shown in FIGS. 9 and 10 and that the transform circuits in FIG. 11 are given a function for transforming the α data to mask data. Because the mask data may consist of a single bit, part of the α data dedicated registers 190 may be formed into a register structure of one bit for each pixel.

Figure 13:
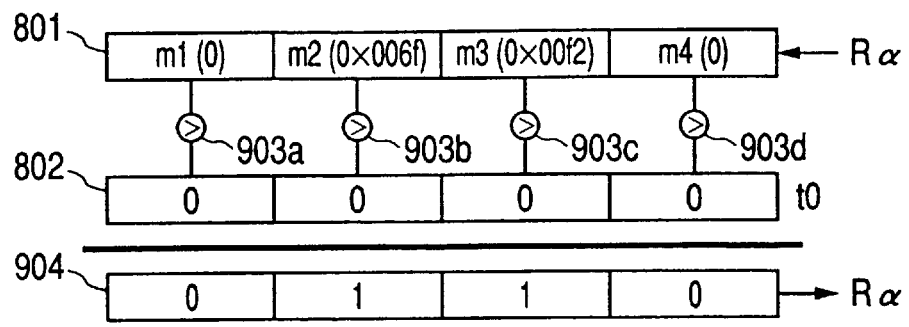
FIG. 13 is a schematic view of another typical data operation process inside the α data dedicated control circuit.

Described below with reference to FIGS. 11 and 13 are the workings of the inventive parallel processing processor above, along with an arithmetic instruction for data masking. FIG. 13 is a schematic view of another typical data operation process inside the α data dedicated control circuit.

The processing by the α data dedicated control circuit is basically the same as that described in (II-1) above. It should be noted that an output 904 constitutes mask data and is output in a multiplexed form to the α data dedicated registers 190. Whether mask data are expressed in a 16-bit or single-bit format depends on the structure of the α data dedicated registers 190.

Instructions used by the parallel processing processor above are described here. A combination instruction for loading α data from the external memory 130 into the α data dedicated register 190 and for generating mask data may be expressed illustratively in the assembler format shown below. In the format, "0" represents the threshold value for the compare operation.

LOADMask R α, start_alpha(R6), 0

When the mask data above are used, the assembler codes 3 and 4 are replaced by assembler codes 6 and 7 below respectively. The assembler code 3 applies when the α data dedicated register setup contains a single register address or when the registers making up the α data dedicated register setup correspond to general purpose registers on a one-to-one basis. The assembler code 4 is used when the α data dedicated register setup includes a plurality of registers each addressable.

Assembler code 6: for use when α data are gray scale data and when the α data dedicated register setup has a single register LOAD R1, start_curr(R4)

LOAD R2, start_reference(R5)

LOADMask R α, start_alpha(R6), 0

SUB R0, R1, R2

ABSMask R9, R0

Assembler code 7: for use when α data are gray scale data and when the address of an α data dedicated register used is explicitly designated LOAD R1, start_curr(R4)

LOAD R2, start_reference(R5)

LOADMask R α 1, start_alpha(R6),0

SUB R0, R1, R2

ABSMask R9, R0, R α 1 where, LOADs stand for the data transfer instructions for transferring data from the external memory to a general purpose register, SUB for a subtractive arithmetic instruction (R0=R1−R2), and ABSMask for a combined instruction of an absolutization arithmetic instruction and a data mask processing instruction (R9=Mask(|R0|)).

The difference between the assembler codes 3 and 4 on the one hand and the assembler codes 6 and 7 on the other hand is that the LOAD instruction on the third line is replaced by a LOADMask instruction and the ABSAND instruction by an ABSMask instruction. The ABSMask instruction differs from the ABSAND instruction in that mask processing is carried out by use of mask data in the α data dedicated register.

Figure 14:
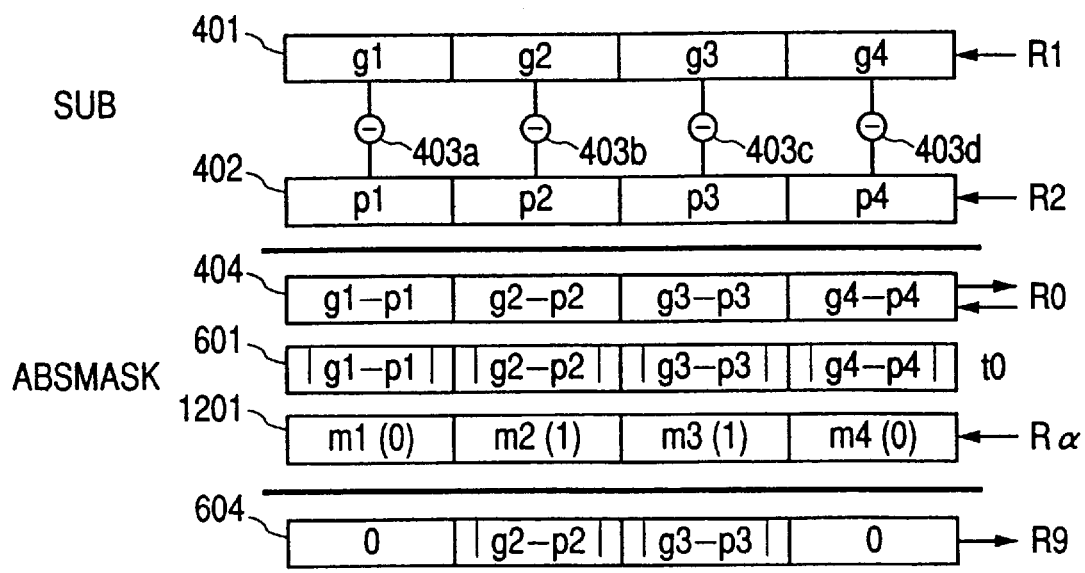
FIG. 14 is a schematic view of another typical setup in which the inventive ALUs operate on data.

Described below with reference to FIG. 14 are the workings of the parallel processing processor in these arrangements. FIG. 14 is a schematic view of another typical data operation process with respect to the ALUs.

The difference between the process of FIG. 6 and that of FIG. 14 is that input data to the ALUs are α data in FIG. 6 while the α data are replaced by mask data in FIG. 14.

Below is a description of how parallel data processing takes place illustratively when the assembler code 6 is in use. In the case of the assembler code 3 explained in conjunction with FIG. 6, the ABSAND instruction was carried out in parallel on four ALUs using data 601 and 602. The result 604 of the operation was written to the register R9. With the assembler code 6, the ABSMask instruction is performed by use of the data 601 and mask data 1201; the result 604 of the operation is written to the register R9. The only difference is that of the format for the data 602 and mask data 1201. More specifically, the ABSAND instruction of the assembler code 3 takes as its operand the 16-bit α data transformed to binary data and placed in the α data dedicated register 190. The ABSMask instruction of the assembler code 6, on the other hand, takes the mask data in the α data dedicated register 190 as its operand.

Applicability of this Invention

Although the description above contains many specificities, these should not be construed as limiting the scope of the invention but as merely providing illustrations of the presently preferred embodiments of this invention as well as several assembler codes to be executed in conjunction therewith. It is to be understood that changes and variations may be made without departing from the spirit or scope of the ensuing claims. Some variations of the invention are outlined below.

(1) The embodiments above were shown dealing with image data in particular for polygon matching. Alternatively, the invention may apply to other computations involving α data such as image synthesizing and error calculations.

(2) With the above embodiments, the masking process based on α data was described solely in connection with the instruction combining the AND or Mask instruction with the absolute value operation instruction (ABS). However, this feature is not limitative of the invention. In addition to the ABS instruction, the inventive parallel processing processor may also address other general arithmetic and logical operations such as addition, subtraction, multiplication, division and OR. The invention also applies to combination instructions each combining two or more arithmetic and logical operations. As for instructions to be performed on α data, the inventive parallel processing processor may perform not only the AND instruction but also other general arithmetic and logical instructions covering such operations as multiplication, division and shift.

(3) The embodiments of the invention were described as comprising the α data control circuit that includes transform circuits with a function for transforming α data to binary data or mask data. In addition to that function, the invention embraces quantization of α data and a shift amount transform function for shift operation, the function being implemented in conjunction with a suitable data path structure and an appropriate processing method according to the invention.

(4) Although the above embodiments were shown adopting a 16-bit data format and a four-execution unit setup for parallel processing, this is not limitative of the invention. Alternatively, the inventive parallel processing processor may be implemented using other data formats and a different number of parallelly arranged execution units. In particular, the handling of eight-bit α data in eight-fold parallelism environment is important for image processing. Whereas the embodiments above were described as dealing with eight-bit image data, the invention also applies when the resolution of images is more than eight bits.

(5) The above embodiments of the invention were explained on the assumption that α data dedicated registers are provided separately from general purpose registers. In other embodiments having the same capabilities, part of the general purpose registers may alternatively be handled as α data dedicated registers, or general purpose registers may alternatively contain α data dedicated registers. In such cases, it is necessary that the data path and control path be structured as shown in FIG. 1 and that color data and α data be received in synchronism from general purpose registers. Where an α data control circuit is provided, that circuit must be connected via a data path to α data dedicated registers included in general purpose registers.

(6) Although the embodiments above were shown adopting the SIMD type processor, this is not limitative of the invention. Other types of processors to which the invention is applied include processors or circuits with their execution units capable of parallelly executing an instruction therein. That is, the invention also applies to motion prediction circuits, DSP (digital signal processors) and other processors for performing various specialized functions. The invention is also applicable to a SIMD type parallel computer wherein a single instruction is broadcast to a plurality of SISD type processors.

As described, the inventive parallel processing processor performing image processing involving α data has a dedicated function for processing the α data in order to increase the processing speed of the data masking operation based on the α data, and carries out data transformation so as to avoid the use of conditional branch instructions. These features boost the throughput of the parallel processing processor according to the invention.

What is claimed is:

1. A parallel processing processor for processing images including α data indicative of pixel transparency, said parallel processing processor comprising:

a plurality of execution units for parallelly executing arithmetic and logical operations under control of a single instruction;

general purpose registers which are connected to said execution units via a data path, which input data to said execution units and which receive results of operations from said execution units;

an α data dedicated register which is connected to said execution units via another data path and which inputs data to said execution units; and controlling means for directing data from said general purpose registers and said α data dedicated register into each of said execution units under control of a single instruction.

2. A parallel processing processor according to claim 1, wherein said α data dedicated register is contained in said general purpose registers.

3. A parallel processing processor according to claim 2, wherein said α data dedicated register is constituted by a plurality of addressable registers, and wherein said execution units admit data from one of the addressable registers which is designated by an instruction and perform said second arithmetic and logical operation between the admitted data and the result of said first arithmetic and logical operation.

4. A parallel processing processor according to claim 2, wherein said α data dedicated register is constituted by a plurality of registers, each address of which corresponds to that of registers inside said general purpose registers, and wherein said execution units admit data from one of said α data dedicated registers corresponding in addressing to one of said general purpose registers which is designated by an instruction and perform said second arithmetic and logical operation between the admitted data and the result of said first arithmetic and logical operation.

5. A parallel processing processor according to claim 1, wherein the data in said general purpose registers are results of operations on color data and the data in said α data dedicated register is α data.

6. A parallel processing processor according to claim 1, further comprising an α data transform circuit for transforming α data into binary data all made up of either 0 bits or 1 bits, wherein, under control of a single instruction, said α data transform circuit performs the data transformation and said binary data are loaded into said α data dedicated register.

7. A parallel processing processor according to claim 1, further comprising an α data transfer circuit for transforming α data into mask data made of either 0's or 1's, wherein, under control of a single instruction, said α data transform circuit performs the data transformation and said mask data are loaded into said α data dedicated register.

8. A parallel processing processor according to claim 1, further comprising an α data transform circuit for comparing input α data with a predetermined threshold value and for transforming said α data into binary data all made up of either 0 bits or 1 bits depending on an outcome of the comparison, wherein, under control of a single instruction, said α data transform circuit performs the data transformation and said binary data are loaded into said α data dedicated register.

9. A parallel processing processor according to claim 1, further comprising an α data transform circuit for comparing input α data with a predetermined threshold value and for transforming said α data into mask data all made up of either 0's or 1's depending on an outcome of the comparison, wherein, under control of a single instruction, said α data transform circuit performs the data transformation and said mask data are loaded into said α data dedicated register.

10. A parallel processing processor for processing images including α data indicative of pixel transparency, said parallel processing processor comprising:

a plurality of execution units for parallelly executing arithmetic and logical operations under control of a single instruction;

general purpose registers which are connected to said execution units via a data path, which input data to said execution units and which receive results of operations from said execution units; and an α data dedicated register which is connected to said execution units via another data path and which inputs data to said execution units;

wherein, under control of a single instruction, said execution units admit data from said general purpose registers to carry out first arithmetic and logical operation on the admitted data and, without returning result of said first arithmetic and logical operation to said general purpose registers, receive data from said α data dedicated register to perform second arithmetic and logical operation between the received data and the result of said first arithmetic and logical operation.

11. A parallel processing processor according to claim 10, wherein said α data dedicated register is contained in said general purpose registers.

12. A parallel processing method for use with a plurality of execution units for executing in parallel arithmetic and logical operations under control of a single instruction, said parallel processing method processing images including α data indicative of pixel transparency and comprising the steps of:

inputting a plurality of first data from general purpose registers to said execution units for performing first arithmetic and logical operation in parallel by the units;

inputting a plurality of second data corresponding to said first data from an α data dedicated register to said execution units without returning result of said first arithmetic and logical operation to said general purpose registers, so as to perform second arithmetic and logical operation in parallel between said second data and said result of said first arithmetic and logical operation; and outputting result of said second arithmetic and logical operation to a general purpose register designated by an instruction.

13. A parallel processing method according to claim 12, wherein said α data dedicated register is contained in said general purpose registers.

14. A parallel processing method according to claim 12, wherein said first data in said general purpose registers is a result of operations on color data and said second data in said α data dedicated register is α data.

15. A parallel processing method according to claim 12, further comprising the step of transforming α data into binary data all made up of either −0 bits or 1 bits under control of another single instruction, said binary data being loaded as said second data into said α data dedicated register.

16. A parallel processing method according to claim 12, further comprising the step of transforming α data into mask data of either value 0 or value 1 under control of another single instruction, said mask data being loaded as said second data into said α data dedicated register.

17. A parallel processing method according to claim 12, further comprising the step of, under control of another single instruction, comparing input α data with a predetermined threshold value and transforming said α data into binary data all made up of either 0 bits or 1 bits depending on an outcome of the comparison, said binary data being loaded as said second data into said α data dedicated register.

18. A parallel processing method according to claim 12, further comprising the step of, under control of another single instruction, comparing input α data with a predetermined threshold value and transforming said α data into mask data of either value 0 or value 1 depending on an outcome of the comparison, said mask data being loaded as said second data into said α data dedicated register.

19. A parallel processing method according to claim 12, wherein said α data dedicated register is-constituted by a plurality of addressable registers, said parallel processing method further comprising the step of causing said execution units to admit data from one of the addressable registers which is designated by an instruction and to perform said second arithmetic and logical operation between the admitted data and the result of said first arithmetic and logical operation.

20. A parallel processing method according to claim 12, wherein said α data dedicated register is constituted by a plurality of registers, each address of which corresponds to that of register inside said general purpose registers, said parallel processing method further comprising the step of causing said execution units to admit data from one of said registers corresponding in addressing to one of said general purpose registers which is designated by an instruction and to perform said second arithmetic and logical operation between the admitted data and the result of said first arithmetic and logical operation.

* * * * *